United States Patent
Eberlein et al.

(10) Patent No.: US 9,336,227 B2
(45) Date of Patent: May 10, 2016

(54) SELECTIVE SYNCHRONIZATION IN A HIERARCHICAL FOLDER STRUCTURE

(71) Applicants: Peter Eberlein, Walldorf (DE); Lukas Gross, Walldorf (DE)

(72) Inventors: Peter Eberlein, Walldorf (DE); Lukas Gross, Walldorf (DE)

(73) Assignee: SAP SE, Walldorf (DE)

( * ) Notice: Subject to any disclaimer, the term of this patent is extended or adjusted under 35 U.S.C. 154(b) by 334 days.

(21) Appl. No.: 14/047,748

(22) Filed: Oct. 7, 2013

(65) Prior Publication Data

US 2015/0100546 A1 Apr. 9, 2015

(51) Int. Cl.
*G06F 17/30* (2006.01)

(52) U.S. Cl.
CPC .... *G06F 17/30174* (2013.01); *G06F 17/30176* (2013.01)

(58) Field of Classification Search
CPC .............. G06F 17/30174; G06F 17/30176
USPC .......................................................... 707/610
See application file for complete search history.

(56) References Cited

U.S. PATENT DOCUMENTS

| | | | | |
|---|---|---|---|---|
| 8,156,074 | B1* | 4/2012 | Multer | G06F 17/30174 707/610 |
| 8,825,597 | B1* | 9/2014 | Houston | H04L 67/06 707/610 |
| 2006/0282438 | A1* | 12/2006 | Zhou | G06F 17/30961 |
| 2006/0291721 | A1* | 12/2006 | Torr | G06K 9/342 382/173 |
| 2007/0100834 | A1* | 5/2007 | Landry | G06F 17/30575 |
| 2007/0174246 | A1* | 7/2007 | Sigurdsson | G06F 17/30176 |
| 2008/0154919 | A1* | 6/2008 | Barlen | G06F 21/552 |
| 2010/0082534 | A1* | 4/2010 | Sagar | G06F 17/30174 707/610 |
| 2010/0262582 | A1* | 10/2010 | Garcia-Ascanio | G06F 17/30174 707/634 |
| 2011/0022638 | A1* | 1/2011 | Jiang | G06F 17/30743 707/797 |
| 2012/0136878 | A1* | 5/2012 | Cypher | G06F 17/30327 707/752 |
| 2012/0278366 | A1* | 11/2012 | Insko | G06F 17/30286 707/802 |

\* cited by examiner

*Primary Examiner* — Rehana Perveen
*Assistant Examiner* — Tiffany Thuy Bui
(74) *Attorney, Agent, or Firm* — Fountainhead Law Group PC

(57) ABSTRACT

A technique is described to selectively synchronize content on a client database with content from a server database. As the user traverses a hierarchical folder structure of the client database, he may run into content that has been deleted or moved in the server database. If the content is something that the user wishes to store locally, the content can be stored as an orphan. An orphan is content stored on the client that cannot be traversed by the hierarchical folder structure. When the user traverses to a node in the hierarchical folder structure that is missing an object existing on the server, a determination can be made as to whether the orphan object is the missing object. If so, the orphan object can be connected once against to the hierarchical folder structure. This may minimize the content that needs to be re-downloaded from the server.

20 Claims, 14 Drawing Sheets

Server Database

Local Database

SELECTIVE SYNCHRONIZATION IN A HIERARCHICAL FOLDER STRUCTURE

BACKGROUND

Unless otherwise indicated herein, the approaches described in this section are not prior art to the claims in this application and are not admitted to be prior art by inclusion in this section.

Mobile devices are becoming increasingly powerful and capable of performing day to day tasks. However, the available storage on mobile devices (e.g., smartphones, tablets, etc.) is limited when compared to that on a server (or personal computer). As a result, only a subset of files available on the server can be stored on the mobile device. While the mobile device may have access to all the files on the server when a network connection exists between the mobile device and the server, the mobile device is limited to the files stored locally when there is no network connection.

Since the files on the server can change over time, it is necessary to periodically synchronize the global database stored on the server and the local database stored on the mobile device. For a given folder, the mobile device can selectively delete files that are no longer in the corresponding folder on the global database and download new files or updated files that belong to the corresponding folder on the global database. This deletion and download process can be time consuming and bandwidth intensive. Given the limited network bandwidth and high latency, there is a need for improved techniques for selectively synchronizing data.

SUMMARY

In one embodiment, a computer-implemented method receives a request to synchronize a first folder object in a first folder structure of a first database with a first corresponding folder object in a second folder structure of a second database, wherein the first folder structure is configured to traverse objects stored in the first database and the second folder structure is configured to traverse objects stored in the second database. The computer implemented method further determines that the first folder object contains a first child object that is missing from the first corresponding folder object. The computer implemented method further identifies that the first child object is selected for selective synchronization and converts the first child object to an orphan object, wherein the orphan object is stored in the first database but is inaccessible by traversing the first folder structure.

In another embodiment, a non-transitory computer readable storage medium stores one or more programs comprising instructions for receiving a request to synchronize a first folder object in a first folder structure of a first database with a first corresponding folder object in a second folder structure of a second database, wherein the first folder structure is configured to traverse objects stored in the first database and the second folder structure is configured to traverse objects stored in the second database. The one or more programs further comprise instructions for determining that the first folder object contains a first child object that is missing from the first corresponding folder object, identifying that the first child object is selected for selective synchronization, and converting the first child object to an orphan object, wherein the orphan object is stored in the first database but is inaccessible by traversing the first folder structure.

In another embodiment, a computer implemented system comprises one or more computer processors and a non-transitory computer-readable storage medium. The non-transitory computer-readable storage medium comprises instructions, that when executed, control the one or more computer processors to be configured for receiving a request to synchronize a first folder object in a first folder structure of a first database with a first corresponding folder object in a second folder structure of a second database, wherein the first folder structure is configured to traverse objects stored in the first database and the second folder structure is configured to traverse objects stored in the second database, determining that the first folder object contains a first child object that is missing from the first corresponding folder object, identifying that the first child object is selected for selective synchronization; and converting the first child object to an orphan object, wherein the orphan object is stored in the first database but is inaccessible by traversing the first folder structure.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
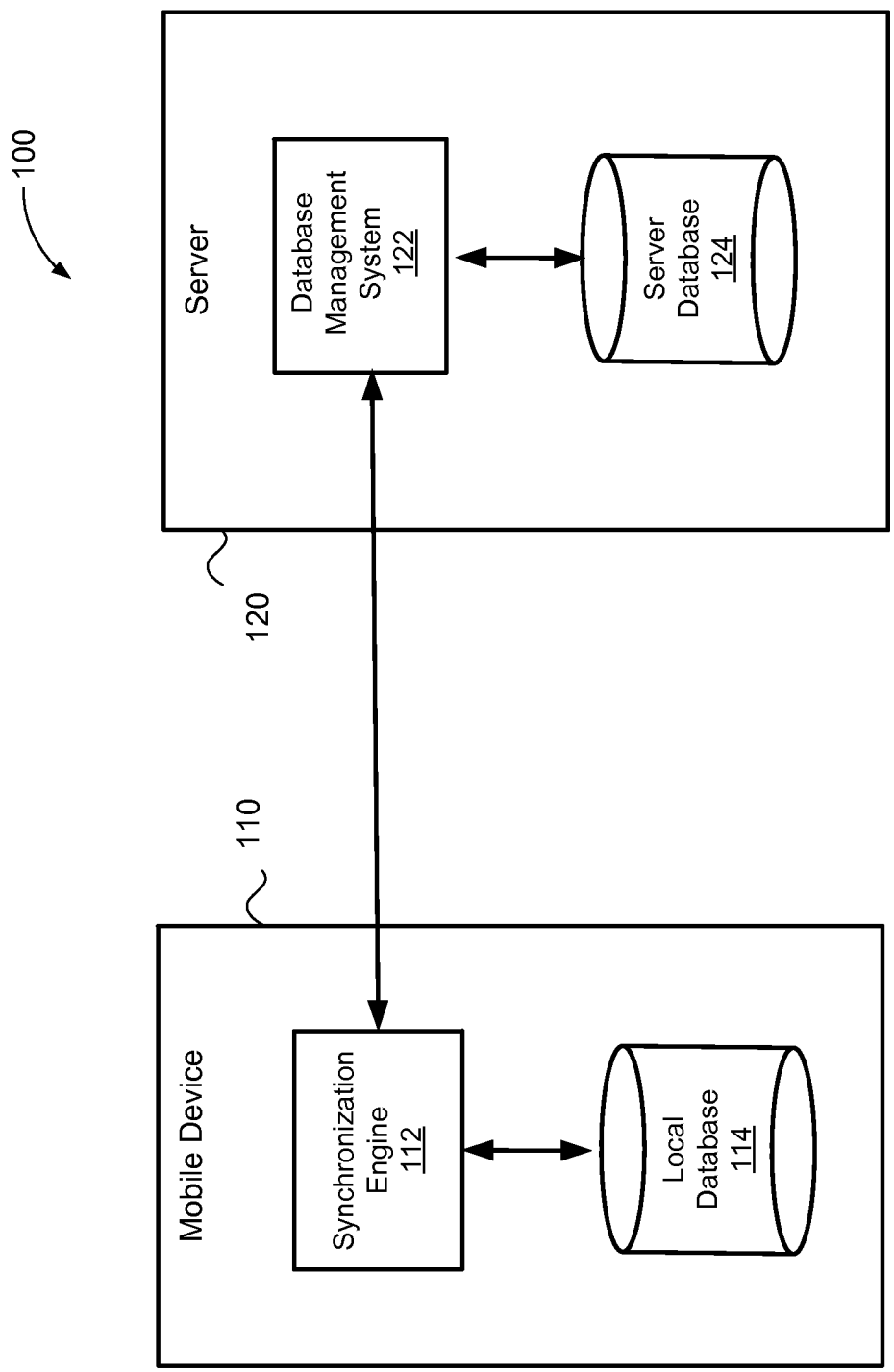
FIG. 1 illustrates a selective synchronization system according to one embodiment.

FIG. 1 illustrates a selective synchronization system according to one embodiment. The synchronization system is configured to synchronize data between a mobile device and a server. In one embodiment, the server serves as a central repository of data in which the mobile device selectively synchronizes data from. Since the mobile device has less storage capacity than the server, only a subset of the data available on the server is synchronized on the mobile device. The mobile device and the server can both include one or more databases that are configured to store data as objects in a hierarchical folder structure. In a hierarchical folder structure, content (e.g., files, documents, photos, media, etc.) is stored in objects. Each object can belong to a folder in the database, which is also an object. Thus, the hierarchical folder structure is made up of many objects, where some objects are folders configured to group other objects, the other objects being configured to store content. Folders can include objects storing content and other objects that represent folders. As a result, the folder structure comprises a hierarchy of folders. Although system 100 is described below as a system that includes mobile device and serve, it is to be understood by one of ordinary skill in the art that these techniques can also be applied to other client/server systems. For example, the same techniques can be applied to a system containing a personal computer and a server or a system containing a mobile device and a personal computer.

System 100 includes mobile device 110 and server 120. Server 120 includes database management system 122 and server database 124. Server database 124 can be configured to store data in a hierarchical data structure while database management system 122 can be configured to respond to requests from mobile device 110 to retrieve metadata, objects for creating the folder structure of a database, and content stored within the objects.

Mobile device 110 includes synchronization engine 112 and local database 114. Local database 114 can be configured to store data in a hierarchical data structure while synchronization engine 112 can be configured to execute one or more algorithms to synchronize data stored in local database 114 with the data stored in server database 124. Synchronization can include synchronizing the folder structure of local database 114 to server database 124. As a result, the folder structure of local database 114 can resemble the fold structure of server database 124. For example if an object is moved from one folder to another in server database 124, that change can be propagated to local database 114 during synchronization. Synchronization can also include updating the content of objects stored within local database 114. For example, content associated with an object can be modified in server database 124. Synchronization can include propagating that content change to local database 114. Local database 114 can be a relational database.

In one embodiment, the synchronization can be performed while a user of mobile device 110 traverses the hierarchical data structure within local database 114. Therefore as mobile device 110 traverses the folder structure in local database 114, traversed folders can be synchronized with server database 124. In another embodiment, the synchronization can be performed at a predetermined interval. For example, the synchronization can be performed whenever mobile device 110 starts up or after a predefined period of time. In yet other embodiments, the synchronization can be performed when an explicit request is received by mobile device 110. For example, the synchronization can be performed whenever an update message is received from server 110, or whenever an explicit request is received from the user. In other examples, the synchronization can be initiated by synchronization engine 112 when other actions are performed by mobile device 110 or server 120.

Figure 2:
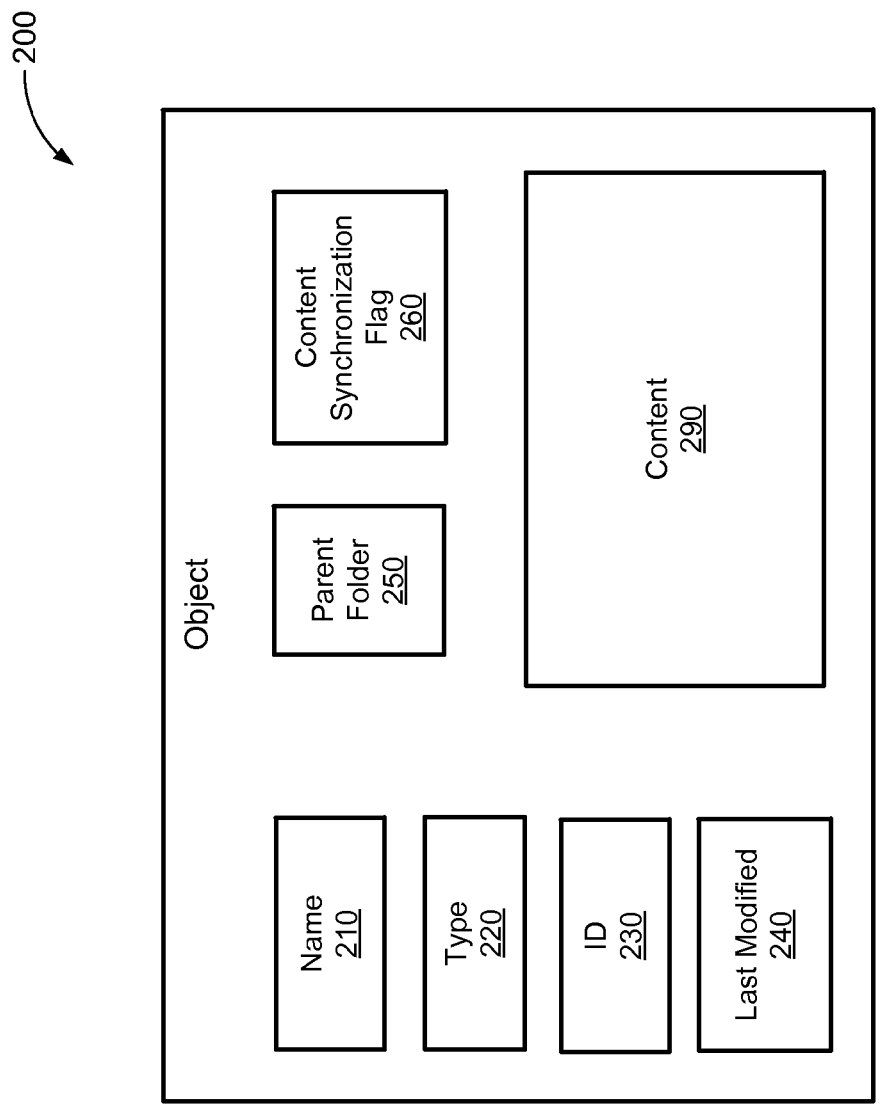
FIG. 2 illustrates a database object according to one embodiment.

FIG. 2 illustrates a database object according to one embodiment. Database object 200 is the basic building block of the hierarchical data structure in local database 114 and server database 124. Database object 200 is configured to store object metadata in a plurality of fields and optionally store content. In this embodiment, the plurality of fields include name field 210, type field 220, ID field 230, modified field 240, parent folder 250, synchronize flag field 260. In other embodiments, other fields or combinations of fields can be possible.

Name field 210 is configured to store the name of the object. Type field 220 is configured to store the object type. The object type can be folder type (signifying that the object is a folder) or content type (signifying that the object is for storing content). ID field 230 is configured to store a unique identifier that is associated with the object. In one embodiment, each unique identifier is assigned by the server as new objects are stored within the server's database. As the folder structure in the server's database is propagated to the mobile device, the same unique identifier can be used to identify the local version of the object that is stored within a local database of the mobile device. This allows the mobile device to not only locate an object by its identifier, but to also synchronize an object in the local database with a corresponding object in the server database.

Last modified field 240 can be configured to store information related to when the object has been last modified. Modification of the object can include changes to the object metadata or changes to the object content. In one embodiment, the modified field can store a time stamp associated with the last time that the object was modified (either metadata or content modification). By comparing the time stamp of a first version of the object against the time stamp of a second version of the object, it can be determined which version is more up to date. Objects that are out of date can be updated accordingly. For example, a first object stored on the local database having a time stamp that is older than a corresponding second object stored on the server database can be updated with metadata or content from the second object during synchronization. In other embodiments, the modified field can store other information that is used to determine which version of an object is more up to date. In one example, database management system 122 of FIG. 1 can update the last modified field 240 of an object whenever the object is updated in the server database. As a result, the object in the server database will have a more recent value stored in the field than a corresponding object stored in the local database of the mobile device. Synchronization engine 112 of FIG. 1 can perform this comparison between the values in the last modified field 240 to determine whether an object stored in the local database needs to be updated during synchronization.

Parent folder field 250 is configured to store a unique identifier. The unique identifier can belong to a folder object (i.e., an object that is folder type) in the database, thus signifying that the current object belongs to the folder object (i.e., the current object is a child of the folder object in the database). All child objects of the folder object in the database can have the unique identifier of the folder object set in parent folder field 250. In one embodiment, synchronization engine 112 or database management system 122 can traverse the hierarchical folder structure of their respective databases by querying the database for objects having the unique identifier of a currently traversed object stored in parent folder field 250. For example, synchronization engine 112 can traverse a folder object having identifier '12345' by querying local database 114 for objects that have the identifier '12345' stored in parent folder field 250. The results of the query is a list of objects which are children of the folder object. As objects are moved around and the folder structure changes on the server database, the parent folder field 250 of the moved objects can be updated to represent their new destination in the database.

In one embodiment, parent folder field 250 can be reset and store a NULL value when the object is an orphan of the database. An orphan object is an object that is not part of the folder structure but yet is stored in the database. As a result, the orphan object cannot be reached by traversing the folder structure even though the orphan object is stored in the database. An orphan object can remain in the database in an unconnected state until the orphan object is "adopted" by another object. The orphan object can be adopted by the other object when parent folder 250 of the orphan object is set to the identifier of the other object. Storing orphans in the local database can result in a reduction in network bandwidth use since the orphan object is stored locally awaiting connection to another object rather than being deleted and re-downloaded from the server at a later point in time. An object can be made into an orphan and be adopted according to algorithms executed by synchronization engine 112. Mobile device 110 can also include APIs to query local database 114 for a list of orphan objects (i.e., query the local database for objects having a parent value field 250 set to NULL).

Content synchronization flag 260 is configured to identify objects within local database 114 that are to have their content synchronized. These are objects have been selectively chosen to be stored in their entirety in local database 114. Therefore, synchronization of these selected objects include synchronizing not only the object metadata but also the content stored within the objects. In one embodiment, content synchronization flag 260 is not present in server database 124 since mobile device 110 selects the content that it would like to have synchronized with server 120. A selected synchronization flag 260 implies that the content is to be synchronized with the local database while a deselected synchronization flag 260 implies that the content should not be synchronized with the local database. In one example, mobile device 110 can include a user interface to select and deselect objects that should have their content synchronized in local database 114. In another example, objects stored within server database 124 do not have a content synchronization flag 260 since the server database serves as a repository for the content. As such, all content needs to be kept in sync. In yet another example, server 120 can transmit objects to mobile device 110 with the content synchronization flag 260 unselected by default. The user of the mobile device can then select and/or deselect objects which content are intended to be stored locally in local database 114. In one embodiment, setting the content synchronization flag 260 for a folder object can result in the child objects of the folder to recursively be set for content synchronization. For child objects that are not intended for content synchronization, the user can deselect the content synchronization flag 260 for the child object.

In one embodiment, synchronization engine 112 can synchronize local database 114 with server database 124 as a user traverses the folder structure or at a predetermined interval. During synchronization of an object, synchronization engine 112 can retrieve the content synchronization flag 260 of the object to determine how the object should be synchronized. If the content synchronization flag 260 is selected the object metadata and content 290 are intended to be stored in the local database and as a result, synchronization engine 112 can execute the proper algorithm to perform such action.

Figure 3A:
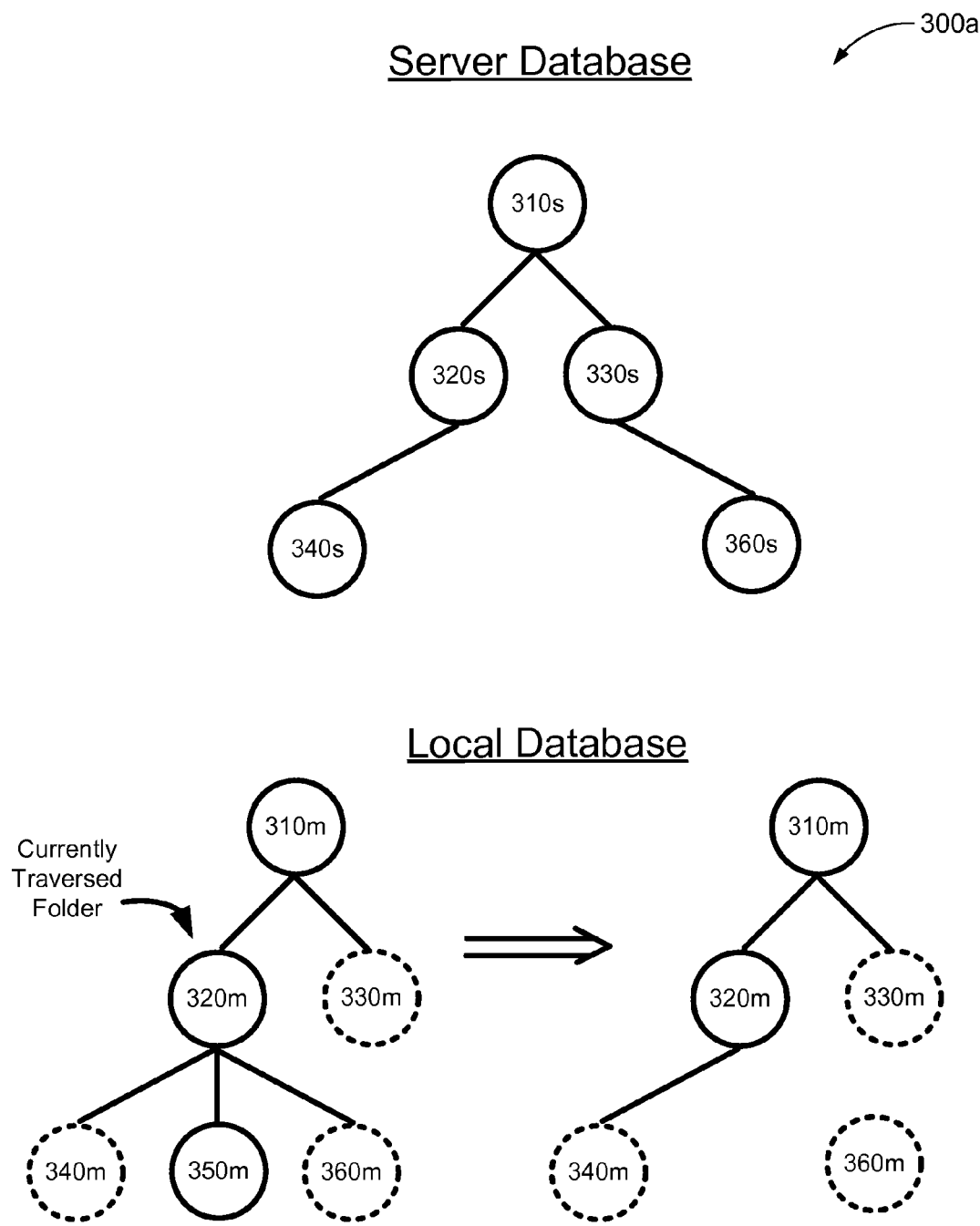
FIG. 3a illustrates an example of creating orphans in a local database according to one embodiment.

FIG. 3a illustrates an example of creating orphans in a local database according to one embodiment. Example 300a includes a folder structure of a server database on the server and a folder structure of a local database on the mobile device before and after synchronization with the server database.

As shown, server database includes objects 310s, 320s, 330s, 340s, and 360s. Here, objects 340s and 360s are content objects (i.e., objects storing database content) however in other embodiments, objects 340s or 360s can be a folder without any children. Object 310s is a root node since it is at the head of the tree. Traversing the folder structure can being with traversal of the root node. Object 310s, 320s, and 330s, are folder objects (i.e., objects that are configured as folders to store other content objects) since they have child nodes. These objects are interconnected in a hierarchical structure. Moreover, the content of the content objects are stored in the server database. A mobile device can synchronize with the objects in the server database to retrieve content to be stored locally.

Shown on the bottom left is local database before synchronization with the server database. Local database includes objects 310m, 320m, 330m, 340m, 350m, and 360m interconnected in a hierarchical structure. Objects having the same numeral prefix in the server database and the local database represent similar objects. The suffix 's' signifies that the object is on the server database while the suffix 'm' signifies that the object is on the local database. Objects that contain dotted lines represent objects that have the content synchronization flag set and therefore, are meant to be have their associated content stored locally in the local database. These objects are also called synced objects. Before synchronization with the system database, objects 330m, 340m, and 360m are synced content objects while object 350m is an un-synced content object. Objects 310m, 320m and 330m are folder objects.

In example 300a, a user has traversed to object 320m in the local database. When an object is traversed, synchronization engine 112 can synchronize the children of the currently traversed object with the server database. Synchronization can include matching the folder structure on the local database to the folder structure on the server database. Here, this can include comparing the child objects of 320m and the child objects of corresponding object 320s. Synchronization engine 112 can perform actions such that the folder structure in the local database matches the folder structure in the server database. Synchronization engine 112 can perform a query in the local database for child objects of object 320m. The query can return a list of objects including object 340m, 350m, and 360m, herein called a local list. Synchronization engine 112 can also request a list of child objects of object 320s from the server database, herein called a server list. After the server list and the local list are retrieved, synchronization engine 112 can compare the two lists to determine which objects are to be removed and added into the folder structure in the local database (i.e., local folder structure).

Here, object 340s in the local list corresponds to object 340m in the server list. Since the object exists in each list, 340m remains a child of object 320m in the local folder structure. In contrast, object 350m and 360m do not have a corresponding object in the server list. As a result, these objects should no longer be a child of object 320m. Object 350m is not a synced object and therefore the user is not interested in the object. As a result, object 350m is deleted from the local database. In contrast, object 360m is a synced object. The user is interested in the contents of object 360m and therefore, object 360m remains in the local database but is no longer a child of 320m. Synchronization engine 112 can convert object 360m into an orphan by clearing its parent folder flag. In one example, clearing can be setting the parent folder flag to a value that represents an orphan or to the value NULL. Orphan object 360m remains stored in the local database but is not accessible by traversing the local folder structure. This is illustrated by object 360m being a node that is not linked to other nodes.

Figure 3B:
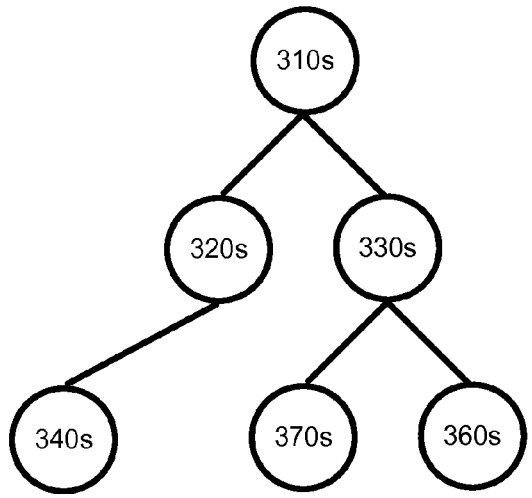
FIG. 3b illustrates an example of adopting an orphan object according to one embodiment.
Figure 3B:
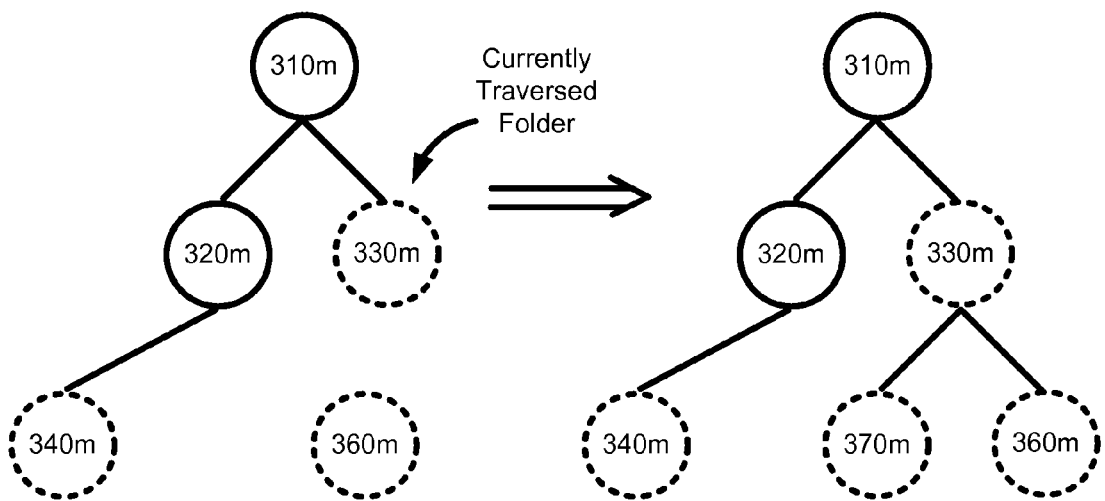

FIG. 3b illustrates an example of adopting an orphan object according to one embodiment. Example 300b includes a folder structure of a server database on the server and a folder structure of a local database on the mobile device before and after synchronization with the server database. Example 300b continues from example 300a where object 320m of the local database has been synchronized. As shown here, the folder structure of the server database have changed from that of example 300a. More specifically, a new object 370s has been added as a child of object 330s.

Shown on the bottom left of FIG. 3b is the folder structure of the local database at the end of example 300a. In example 300b, the user continues by traversing to object 330m in the local folder structure. When object 330m is traversed, synchronization engine 112 can synchronize the children of object 330m with the server database, which includes comparing the child objects of 330m and the child objects of corresponding object 330s. Here, the server list (e.g., child objects of 330s) includes objects 360s and 370s, both of which are missing from the local list (e.g., child objects of 330m, which is an empty list). As a result, synchronization engine 112 can add the missing objects to the local folder structure.

Before downloading a missing object from the server, synchronization engine 112 can perform a query to determine whether the missing object is an orphan object in the local database or an object that is currently a child elsewhere in the local folder structure. The query can be to locate an object with the identifier of the missing object. If the query returns an object, then the object already exists in the local database and synchronization engine 112 can continue by linking the existing object to the currently traversed object. If instead the query does not return the object, then synchronization engine 112 can download the missing object from the server. Here, a query for object 360 returns orphan object 360m in the local database. Synchronization engine 112 can adopt orphan object 360m to object 330m by setting the parent folder field of orphan object 330m to the identifier "330." In contrast, a query for object 370 returns nothing in the local database since object 370 is a recently added object in the server. As a result, synchronization engine 112 can download object 370s from the server (which is subsequently called 370m when downloaded) and set object 370m as a child of object 330m.

In one embodiment, synchronization engine 112 can set the content synchronization flag of downloaded objects to be the same as the currently traversed object. If the user is interested in the content of the currently traversed folder object (i.e., the content synchronization flag of the currently traversed folder object is set), then it is likely that the user is also interested in the content of objects that are newly added to the folder. In other embodiments, the content synchronization flag of objects newly added to the local database are by default unselected.

Figure 4A:
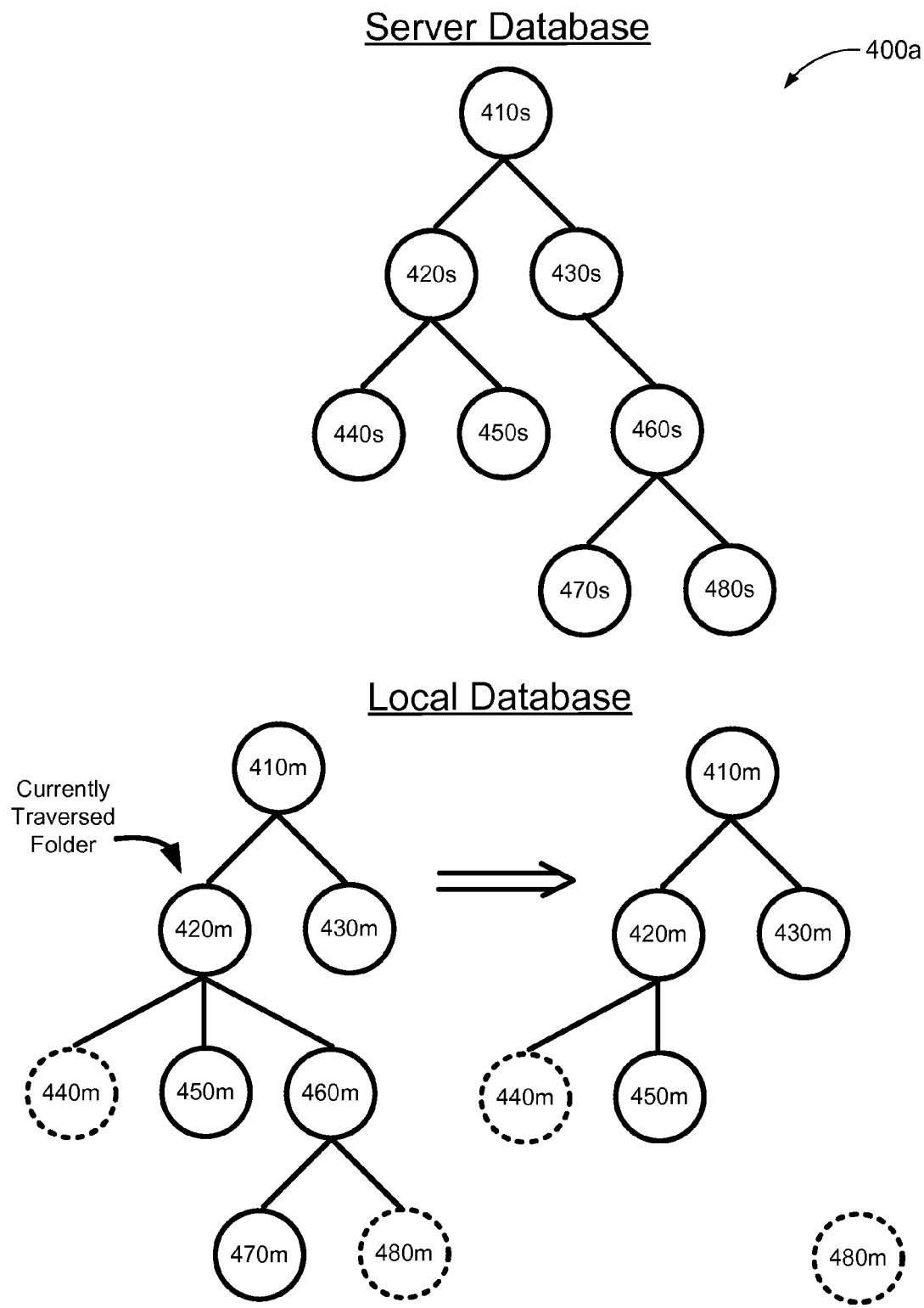
FIG. 4a illustrates an example of removing a folder object from a local folder structure according to one embodiment.

Often times, a local list of objects that are children of a currently traversed object may contain a folder object that is not in the server list of objects. In essence the folder object has either been moved to become a child of a different object on the server or the folder object has been deleted on the server. As a result, synchronization engine 112 can remove the folder object from the local folder structure. FIG. 4a illustrates an example of removing a folder object from a local folder structure according to one embodiment. Example 400a includes a folder structure of a server database on the server and a folder structure of a local database on the mobile device before and after synchronization with the server database. The server database includes objects 410s, 420s, 430s, 440s, 450s, 460s, 470s, and 480s in the server folder structure as shown in FIG. 4a. The local database includes objects 410m, 420m, 430m, 440m, 450m, 460m, 470m, and 480m in the local folder structure as shown on the left side in FIG. 4a.

In example 400a, a user has traversed to object 420m in the local database. When object 420m is traversed, synchronization engine 112 can synchronize the children of object 420m with the server database, which includes comparing the child objects of 420m with the child objects of 420s. Here, the server list includes objects 440s and 450s while local list includes objects 440m, 450m, and 460m. Synchronization engine 112 determines that object 460m is not in the server list and thus prepares to remove object 460m from the local folder structure. In fact, the server database has moved folder object 460s to become a child of folder object 430s instead of folder object 420s.

In one embodiment, removing a folder object can depend on whether the folder object is a synced object (i.e., the content synchronization flag of the folder object is selected). If the folder object is a synced object, the folder object can remain stored in the local database. As a result, the parent folder field of the folder object can be set to NULL or some other predefined value to signify that the folder object is an orphan. If instead the folder object is not a synced object, the folder object can be deleted from the local database. This can include iterating through the children of the folder object to delete child objects that are not synced objects and converting child objects that are synced objects into orphan objects. Here, removing folder object 460m from the local folder structure includes iterating through the child objects object 470m and 480m. Object 470m is not a synced object and thus can be deleted. Object 480m is a synced object and thus is converted into an orphan object. As shown on the right side of FIG. 4a, object 480a is no longer linked to the local folder structure.

Figure 4B:
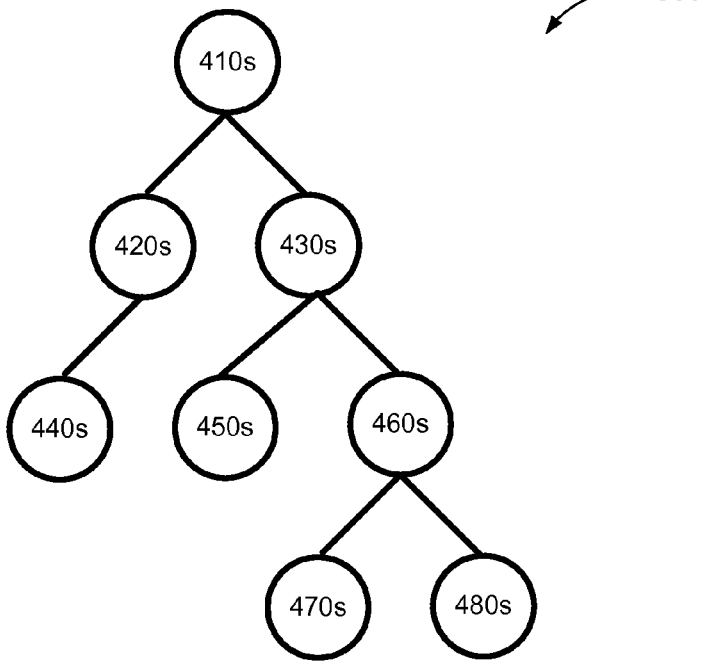
FIG. 4b illustrates an example of adding a folder object to a local folder structure according to one embodiment.
Figure 4B:
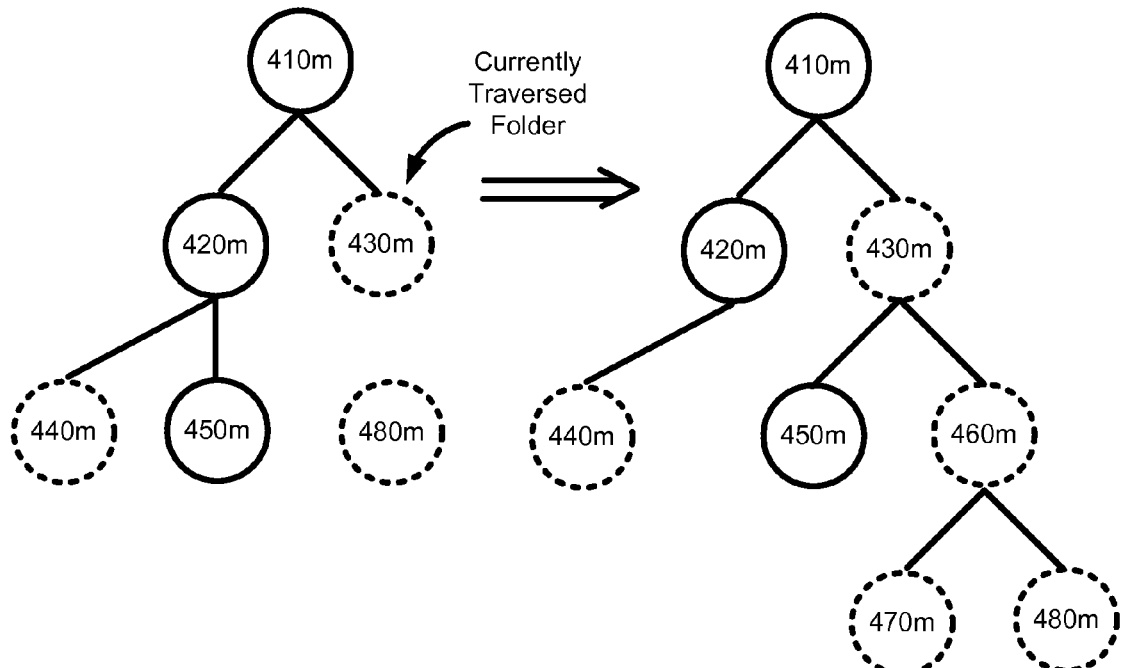

FIG. 4b illustrates an example of adding a folder object to a local folder structure according to one embodiment. Example 400b continues where example 400a left off except that the user has selected object 430m to be a synced object. Server database remains the same as in example 400a except that object 450s has moved from being a child of object 420s to becoming a child of object 430s. The user continues by traversing object 430m in the local folder structure. When object 430m is traversed, synchronization engine 112 can synchronize the children of object 430m with the server database, which includes comparing the child objects of 430m with the child objects of 430s. Here, the server list includes objects 450s and 460s while local list is empty. Synchronization engine 112 determines that object 450s (which is a content object) and folder 460s (which is a folder object) is missing from the local folder structure and prepares to add the missing objects in.

In one embodiment, adding in a missing folder object can be similar to adding in a missing object. Synchronization engine 112 can perform a query to determine whether the missing folder object is an orphan object in the local database or if missing folder object is a folder object that is currently a child elsewhere in the local folder structure. If the query (which is based on the identifier of the missing folder object) returns a folder object, the folder object is linked to the currently traversed object. Child objects of the folder object that are intended to be synced objects will automatically become a part of the local folder structure. If the query does not return a folder object, then synchronization engine 112 can retrieve the missing folder object from the server database. Once the missing folder object is retrieved, it can be added as a child object of the currently traversed object. The newly added folder object can have the content synchronization flag set to the same as the parent folder (i.e., currently traversed object). If the content synchronization flag is selected, the newly added folder object can be traversed to ensure that the children of the newly added object are also included in the local folder structure.

Returning to FIG. 4b, synchronization engine 112 can query the local database for object 450m and determine that 450m exists but as a child of object 420m. As a result, synchronization engine 112 can convert object 450m to be a child of object 430m by setting the parent folder field to "430." Synchronization engine 112 can also query local database for object 460m. Object 460m does not exist within the local database and therefore synchronization engine 112 can download object 460m from the server database. When object 460m is downloaded, it is determined that object 460m should also be a synced object since the currently traversed object 430m is a synced object. Thus, the content synchronization flag of object 460m is set. Synchronization engine 112 also determines that object 460m is of type folder. As a result, synchronization engine 112 can further traverse folder object 460m to synchronize the child objects (since folder object 460m is a synced object). Synchronization engine 112 can determine that object 470m does not exist in the local database and download it from the server database. The newly downloaded object 470m can be a synced object since the parent folder is a synced object. Synchronization engine 112 can also determine that object 480m is an orphan object and link orphan object 480m to folder object 480m. Since object 480m already exists in the local database, object 480m does not need to be downloaded therefore saving network bandwidth usage. The resulting local folder structure is shown on the right side of FIG. 4b.

Figure 4C:
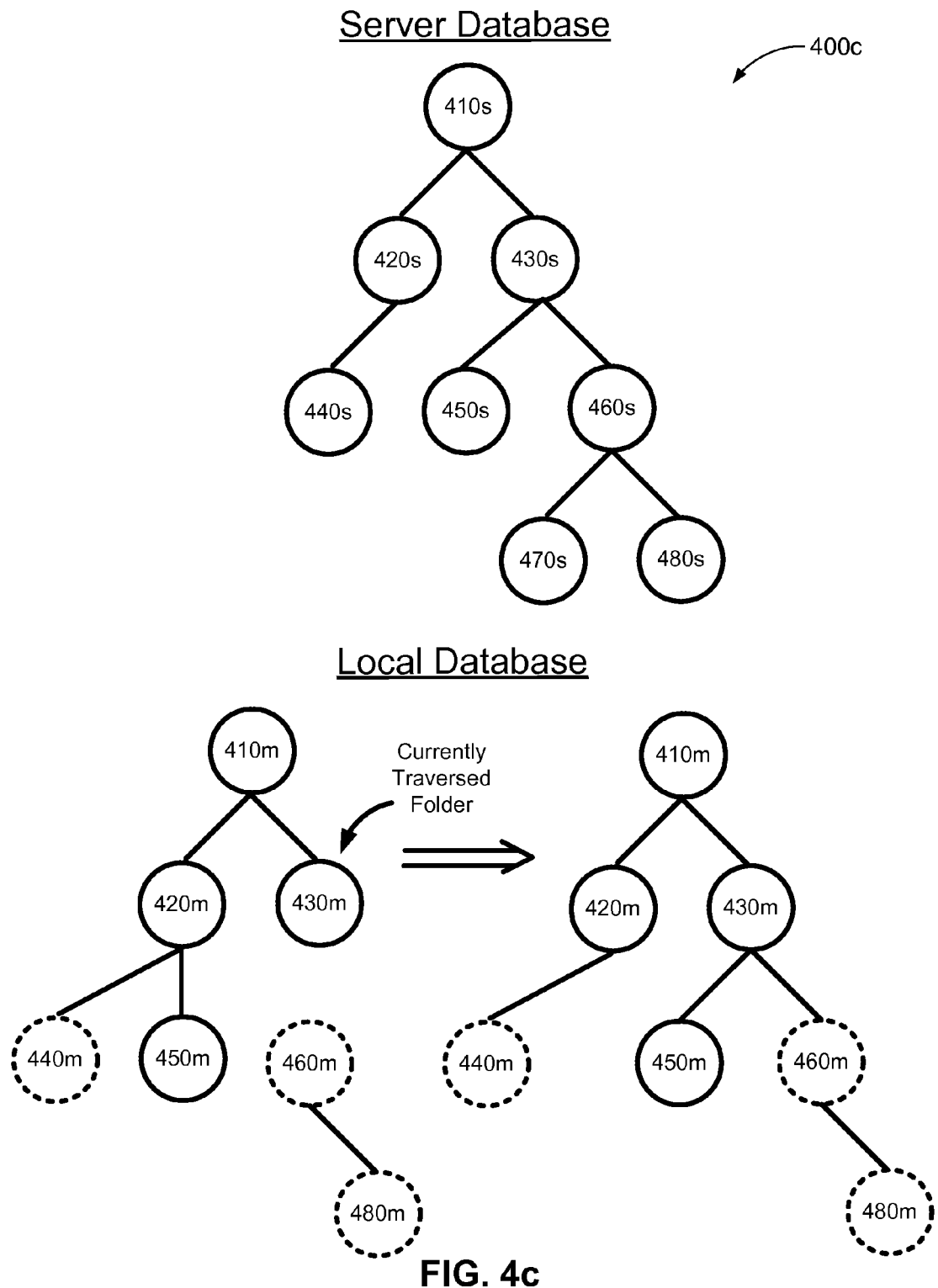
FIG. 4c illustrates another example of adding a folder object to a local folder structure according to one embodiment.

FIG. 4c illustrates another example of adding a folder object to a local folder structure according to one embodiment. As shown here, folder object 460m is an orphan object. When object 430m is traversed, synchronization engine 112 can perform a query in the local database for folder object 460m. The query returns object 460m and adopts the orphan object as a child of object 430m. Object 480m is already stored in the local database as a child object of object 460m. Thus, linking object 460m to object 430m inherently also makes object 480m traversable in the local folder structure. Object 470s which exists as a child of object 460s will be synchronized and added into the local folder structure when object 460m is traversed or when the local database is synchronized at a predefined interval.

FIGS. 5a, 5b, 5c, and 5d illustrate a selective synchronization process according to one embodiment. Process 500 can be implemented in computer readable media and stored within mobile device 110 (i.e., the client) to be executed by synchronization engine 112. Process 500 is a user interface path traversal algorithm to dynamically synchronize the local database as the local folder structure is manually traversed. The traversal can be controlled by a user of the mobile device (or other client device). Process 500 begins by receiving a request to traverse a folder object from a local folder structure at 501. Process 500 can continue by retrieving, from a server folder structure, a server list of child object associated with the current folder at 502. In one example, the server list of child objects can be the children of a folder object in the server database that corresponds to the currently traversed folder object. Process 500 can continue by querying a local folder structure for a local list of child objects associated with the currently traversed folder object at 503. Once the server list and the local list have been created, process 500 continues by comparing the local list and the server list at 504. Process 500 can process each unique object that is in superset of the local list and the server list. The processing of each unique object can depend on the list or lists that the object belongs to. If an object is in both the local list and the server list at step 505, process 500 continues to step 511 in FIG. 5a at 510. If an object is in the server list but not the local list at step 506, process 500 continues to step 521 in FIG. 5b at 520. Otherwise if an object is in the local list but not the server list at step 507, process 500 continues to step 541 in FIG. 5c at 540.

Figure 5A:
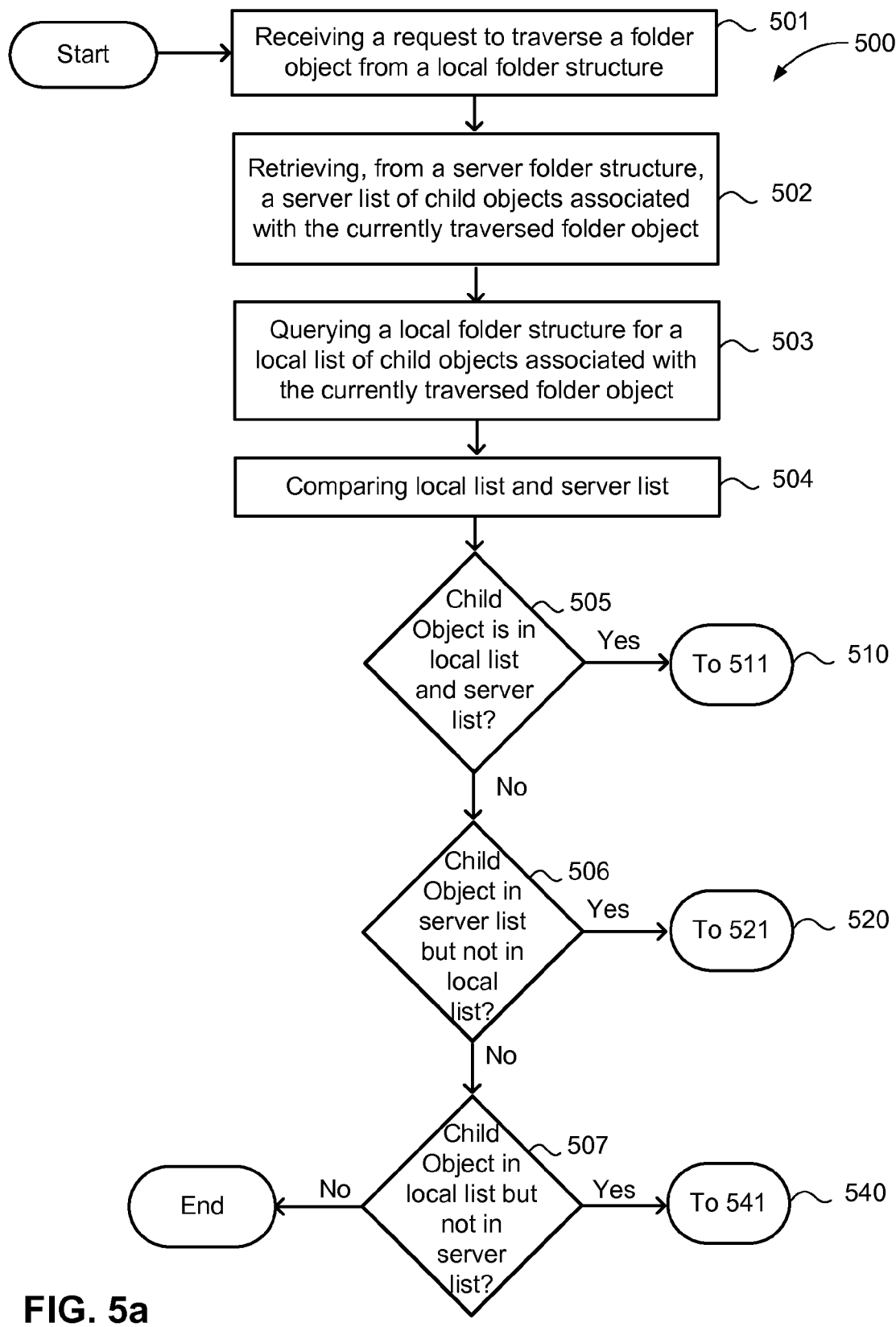
FIGS. 5a, 5b, 5c, and 5d illustrate a selective synchronization process according to one embodiment.
Figure 5B:
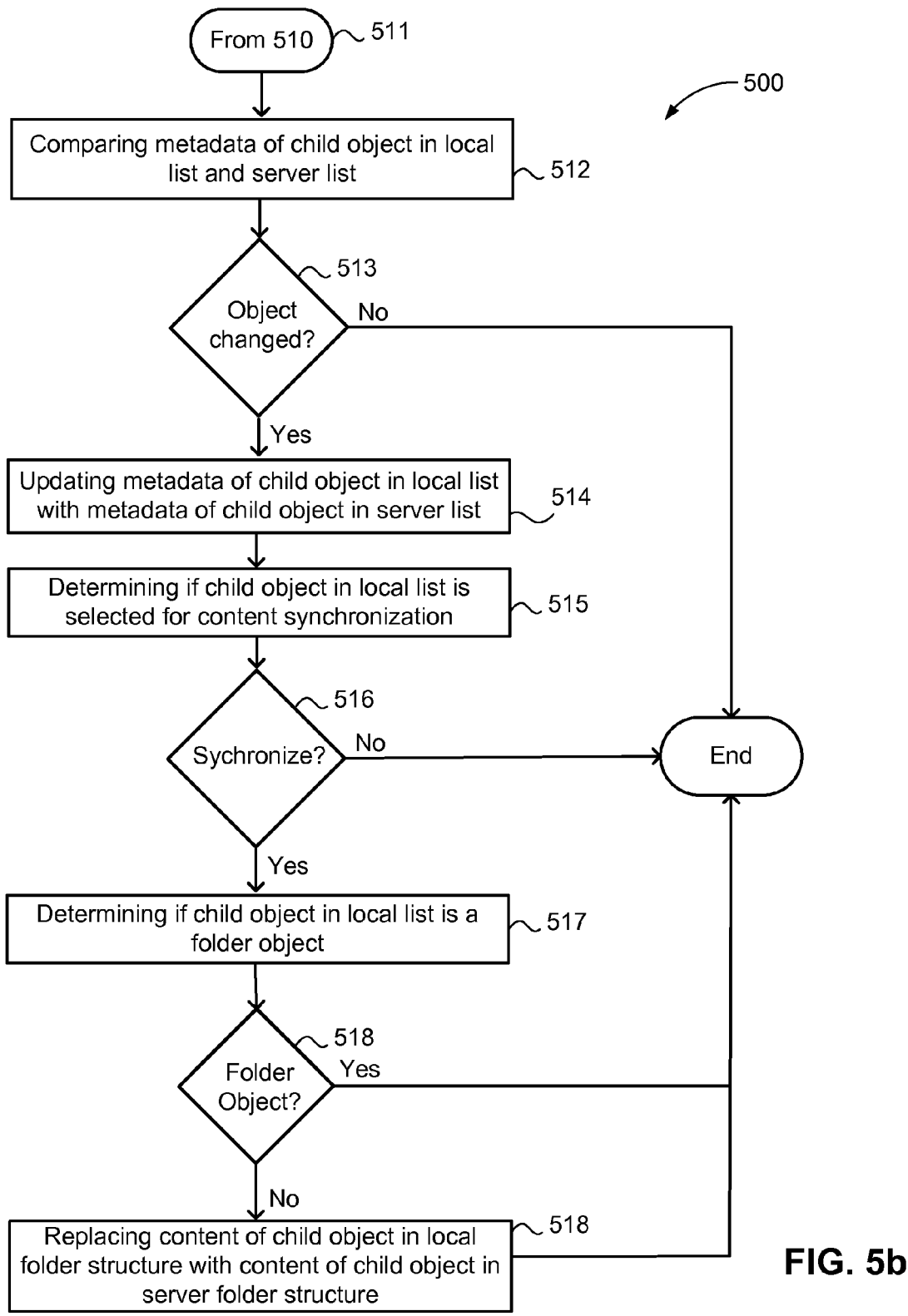

FIG. 5b continues from step 510 of FIG. 5a where a child object is in both the server list and the local list. FIG. 5b covers the scenario where the child object exists in both lists. Process 500 can continue by comparing metadata of the child object in the local list and the corresponding child object in the server list at 512. In one example, comparing the metadata can include comparing the last modified field of the child objects. In another example, comparing the metadata can include comparing the content stored within the child objects. If no change in the child object is found at 512, then process 500 ends for this child object. Alternatively if a change is found in the child object at 512, then process 500 continues by updating the metadata of the child object in the local list with the metadata of the corresponding child object in the server list at 514. This can include updating the last modified field of the child object in the client list.

Process 500 then continues by determining if the child object in the local list is selected for content synchronization at 515. In one example, this can be determined by requesting the content synchronization flag of the child object. The content synchronization flag can be a flag stored locally to identify objects that are to be synchronized with the server. If the child object is intended to not be content synchronized at 516, then process 500 ends for this child object. Alternatively if the child object is intended to be content synchronized 516, then process 500 can continue by determining if the child object in the local list is a folder object at 517. In one embodiment, a child object is a folder object when the type field of the child object is of type folder. If the child object is a folder object at 518, then process 500 ends. If alternatively the child object is not a folder object at 518 (i.e., it is a content type), then process 500 can continue by replacing the content of the child object in the local folder structure with the content of the corresponding child object in the server folder structure at 519. Replacing the content of the child object can include copying the content (or the difference in the content) from the corresponding object in the server database to the object in the local database. Process 500 then ends for this child object.

Figure 5C:
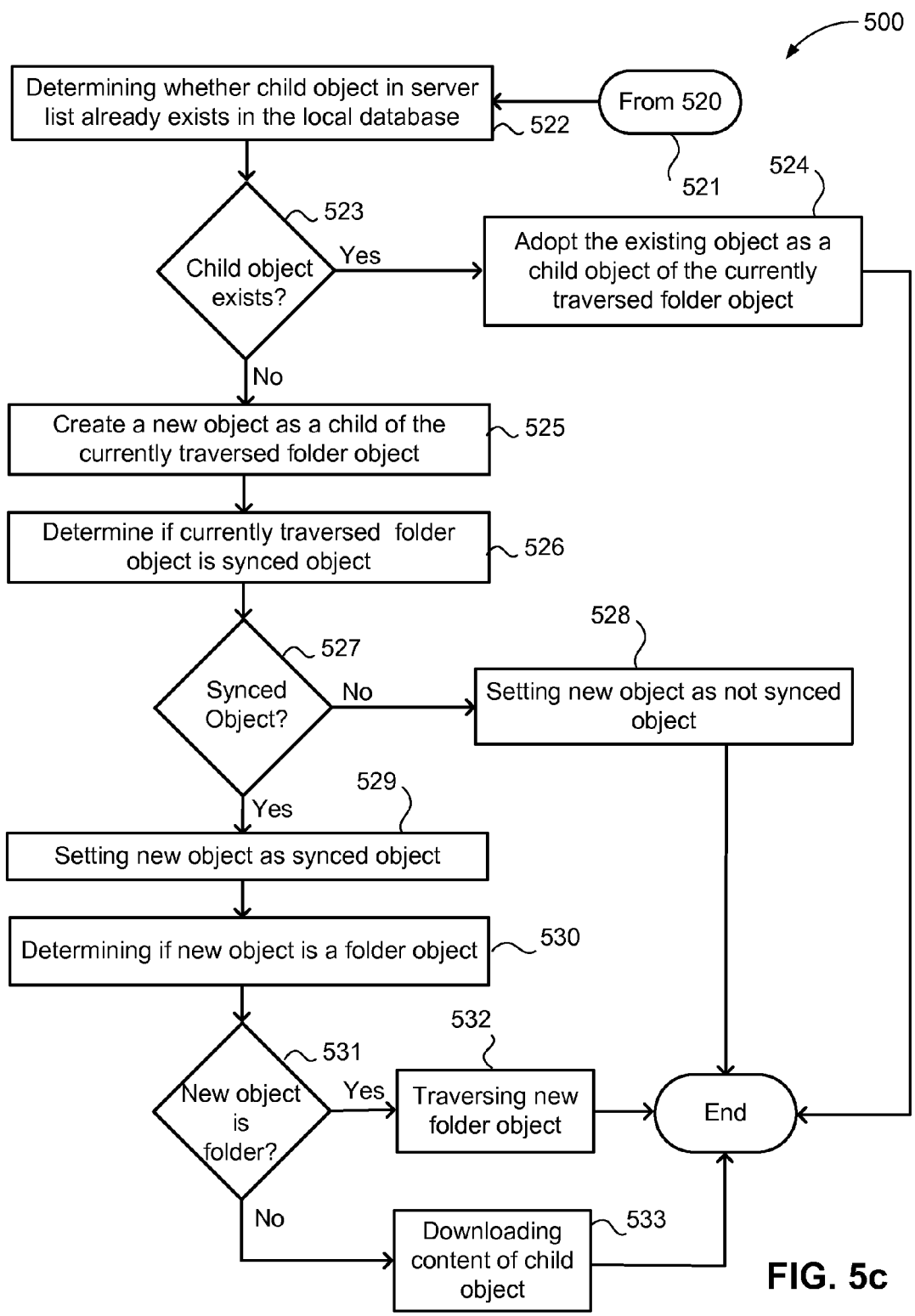

FIG. 5c continues from step 520 of FIG. 5a where a child object is in the server list and but not in the local list. Thus, FIG. 5c covers the scenario where the child object in question is missing from the local list. Process 500 can continue by determining whether child object in server list already exists in the local database at 522. The child object, while not in the local list, may still exist in the local folder structure as a child of a different object or as an orphan object in the local database. If the child object exists in the local database at 523, the child object does not need to be downloaded from the server so process 500 continues by adopting the existing object as a child object of the currently traversed folder object at 524. Alternatively if the child object does not exist elsewhere in the local database at 523, process 500 continues by creating a new object as a child of the currently traversed folder object at 525. In one embodiment, creating the new object can include retrieving the missing child object from the server. The missing object may be retrieved from the server with the content synchronization flag deselected by default. The new object can include the same content and/or metadata as the child object from the server that the new object is based upon.

By default, the new child object is set as a synced object if the parent folder object is also a synced object. The rationale can be that if there is desire to for the parent to be a synced object then the children of the parent should also be synced objects. Process 500 can continue by determining if the currently traversed folder object is a synced object at 526. This can include checking the content synchronization flag of the folder object. If the folder object is not a synced object at 527, then process 500 continues by setting the new object as not a synced object at 528. Process 500 then ends for this child object. Alternatively if the folder object is a synced object at 527, then process 500 continues by setting the new object as a synced object at 529. Process 500 continues by determining if the new object is a folder object at 530. Besides being a synced object if the new object is also a folder object at 531, then process 500 can continue by traversing the new object at 532. In one embodiment, traversing the folder object can involve performing another iteration of process 500 with the new folder object as the currently traversed folder object. Once the new folder object has been traversed, process 500 ends. Alternatively if the new object is not a folder object at 531, then the new object is a child object. Process 500 then continues by downloading the content of the child object from the server at 533. The downloaded content can stored in the new object. After downloading the content, process 500 ends.

Figure 5D:
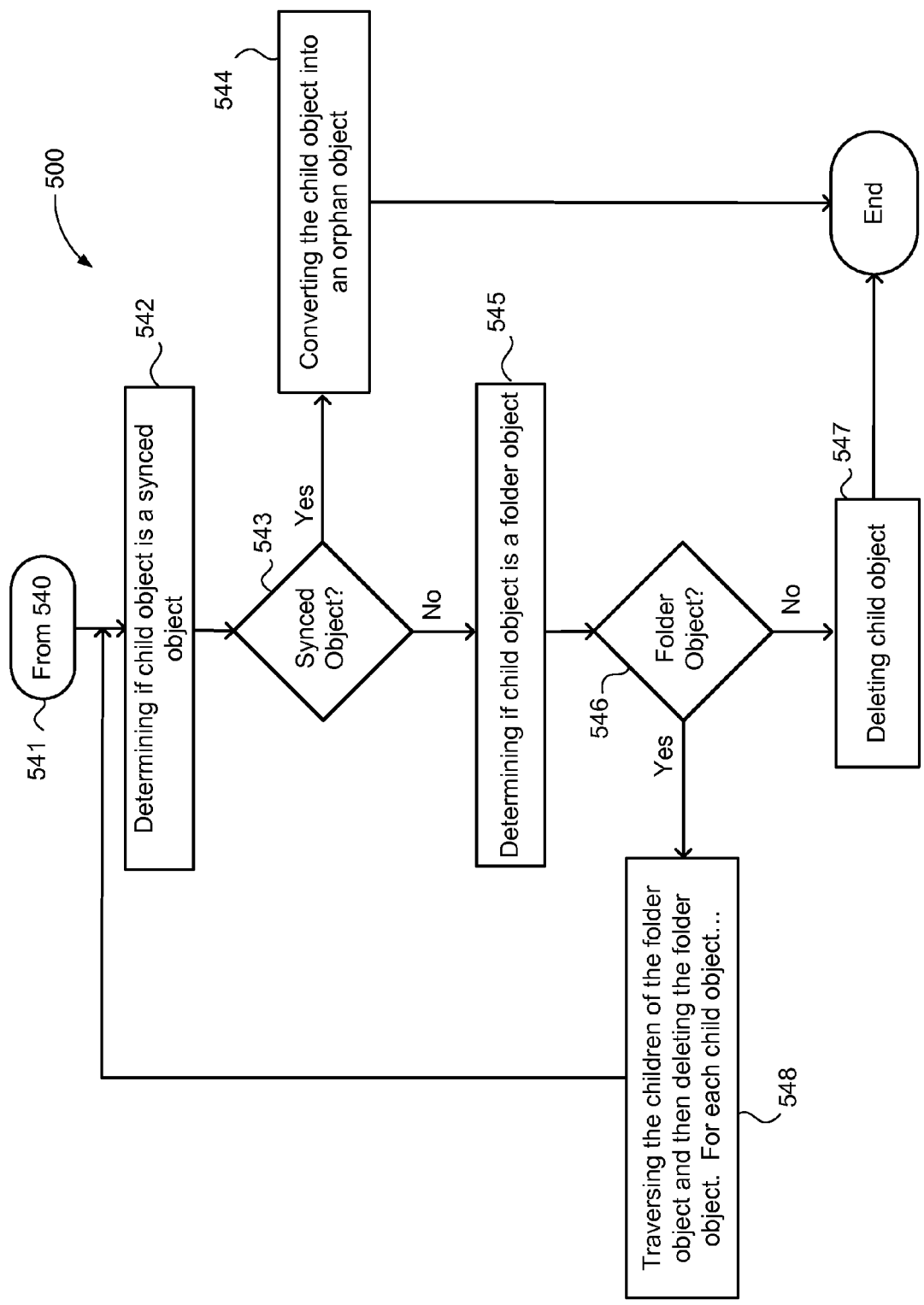

FIG. 5*d* continues from step 540 of FIG. 5*a* where a child object is in the local list and but not in the server list. Thus, FIG. 5*d* covers the scenario where the child object in question has been deleted from the server folder structure or has been moved in the server folder structure. Process 500 continues by determining whether the child object is a synced object at 542. In one embodiment, this determination can be made by evaluating the content synchronization flag field of the child object. If the child object is a synced object at 543, process 500 continues by converting the child object into an orphan object at 544. In one embodiment, converting the child object into an orphan object can include setting the parent folder field of the child object to NULL or some other predefined value that corresponds to an orphan object. The child object can be converted to an orphan object irrespective of whether the child object is of folder type or content type. Both types of objects can be an orphan object, which is an object that exists in the local database but is not traversable by the local folder structure. Once the child object has been converted into an orphan object, process 500 ends for this child object.

Alternatively if the child object is not a synced object at 543, then process 500 continues by determining if the child object is a folder object at 545. If the child object is not a folder object at 546, then process 500 continues by deleting the child object at 547. Processing of this child object then ends. Alternatively if the child object is a folder object at 546, then it is possible that children of the folder object can be a synced object and thus may need to be converted into orphan objects. As a result, process 500 can continue by traversing the children of a folder object and then deleting the folder object at 548. The children of the folder object are not a part of the server list and thus, each child of the folder object continues by determining if the child is a synced object at 542. Once all the children of the folder object are recursively processed, process 500 ends.

Figure 6:
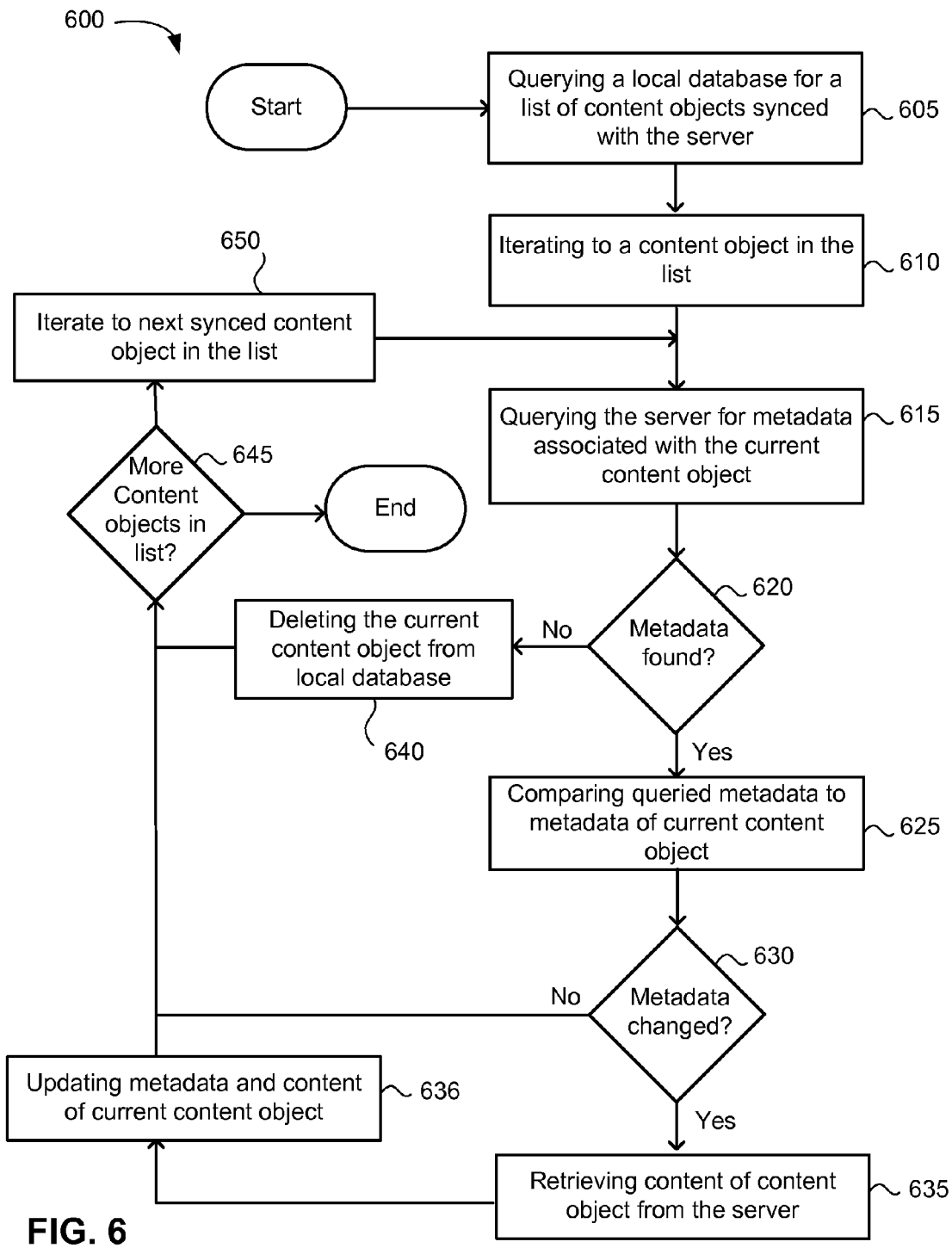
FIG. 6 illustrates a process for synchronizing content objects on a predetermined interval according to one embodiment.

Besides synchronization during user interface path traversal, the local folder structure can also be synchronized on a predetermined interval. Content object synchronization can be separated from folder object synchronization. FIG. 6 illustrates a process for synchronizing content objects on a predetermined interval according to one embodiment. Process 600 can be implemented in computer readable media and stored within mobile device 110 (i.e., the client) to be executed by synchronization engine 112 on a predefined interval. Process 600 begins by querying a local database for a list of content object synced with the server at 605. In one embodiment, the query can be performed by querying the local database for all objects that have a content synchronization flag that is selected and are also of type content. This list includes content objects in the local folder structure that are synced objects. This list also included content objects that are orphan objects.

Process 600 then continues by iterating to a content object in the list at 610 and querying the server for metadata associated with the current content object at 615. In one embodiment, querying the server can include a query request to the server for metadata belonging to an object based on a submitted object identifier. For example if the current content object has an identifier of "430," a query is performed on the server for metadata belonging to an object having an identifier of "430." If the metadata is not found at 620, then process 600 continues by deleting the current content object from the local database at 640. The current content object is deleted from local database since it does not exist on the server. If there are more content objects in the list at 645, then process 500 continues by iterating to the next synced content object in the list at 650.

If instead metadata is found at 620, then process 600 continues by comparing the queried metadata to the metadata of the current content object at 625. If the metadata has not changed at 630, then process 600 determines if there are any more content objects in the list at 645. If there are more content objects in the list at 645, then process 500 continues by iterating to the next synced content object in the list at 650. Alternatively if the metadata has changed at 630, the current content object is to be updated. Process 600 continues by retrieving content associated with the current content object from the server at 635. In one embodiment, this can include retrieving content that is associated with the identifier of the current content object from the server. Process 600 can then continue by updating the metadata and content of the current content object at 636. In one embodiment, this can be performed by using the metadata found from the server and the content retrieved from the server at 636. If there are more content objects in the list at 645, then process 600 continues by iterating to the next synced content object in the list at 650. Once all the content objects in the list have been iterated over, process 600 ends.

Figure 7:
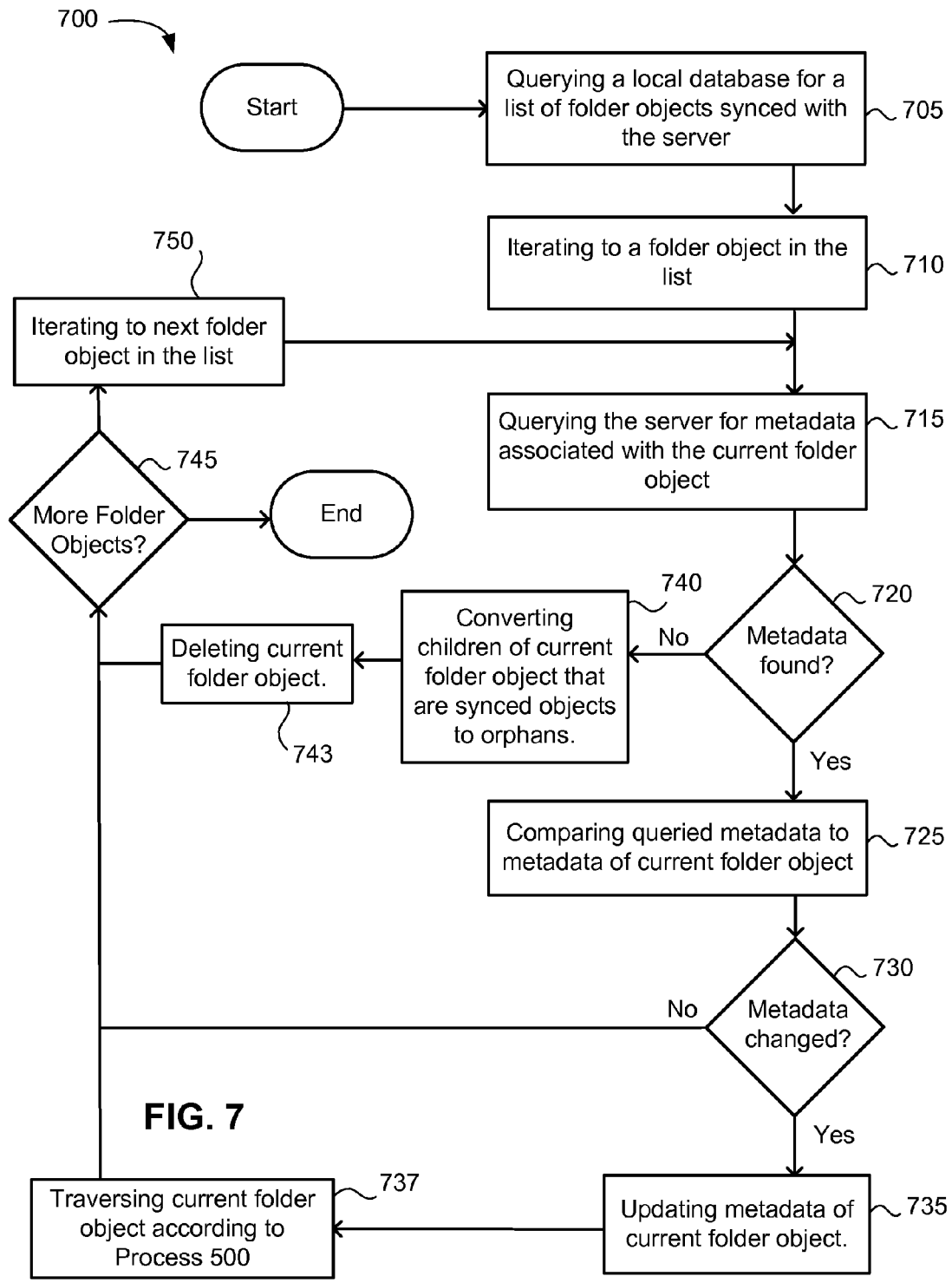
FIG. 7 illustrates a process for synchronizing folder objects on a predetermined interval according to one embodiment.

FIG. 7 illustrates a process for synchronizing folder objects on a predetermined interval according to one embodiment. Process 700 can be implemented in computer readable media and stored within mobile device 110 (i.e., the client) to be executed by synchronization engine 112 on a predefined interval. Process 700 begins by querying a local database for a list of folder objects synced with the server at 705. In one embodiment, the query can be performed by querying the local database for all objects that have a content synchronization flag that is selected and are also of type folder. This list includes folder objects in the local folder structure that are also synced objects. This list also includes folder objects that are orphan objects.

Process 700 then continues by iterating to a folder object in the list at 710 and querying the server for metadata associated with the current folder object at 715. In one embodiment, querying the server can include a query request to the server for metadata belonging to an object based on a submitted object identifier. For example if the current folder object has an identifier of "420," a query is performed on the server for metadata belonging to an object having an identifier of "420." If the metadata is not found at 720, then process 700 continues by converting the children of the current folder object that are synced objects to orphans at 740. In one embodiment, this can include traversing through the children of the current folder object to locate synced objects. If a synced object is located, it is converted into an orphan. The rationale behind this is that the current folder object no longer exists on the server and therefore can be deleted. Before deletion, children of the current folder object that are synced objects can be converted to orphan objects so that they can remain on the local database since it is likely that they are linked to another object. Process 700 can then continue by deleting the current folder object at 743. If more folder objects exist in the list at 745, process 750 continues by iterating to the next folder object in the list. Once all the folder objects in the list are processed, process 700 ends.

If instead metadata is found at 720, then process 700 continues by comparing the queried metadata to the metadata of the current folder object at 725. If the metadata has not changed at 730, then process 700 determines if there are any more folder objects in the list at 745. If there are more folder objects in the list at 745, then process 500 continues by iterating to the next synced folder object in the list at 750. Alternatively if the metadata has changed at 730, the current folder object is to be updated. Process 700 continues by updating the metadata of the current folder object at 735. The updating can be using the queried metadata from the server. Process 700 then continues by traversing the current folder object according to process 500 at 737. If more folder objects exist in the list at 745, process 750 continues by iterating to the next folder object in the list. Once all the folder objects in the list are processed, process 700 ends.

Figure 8:
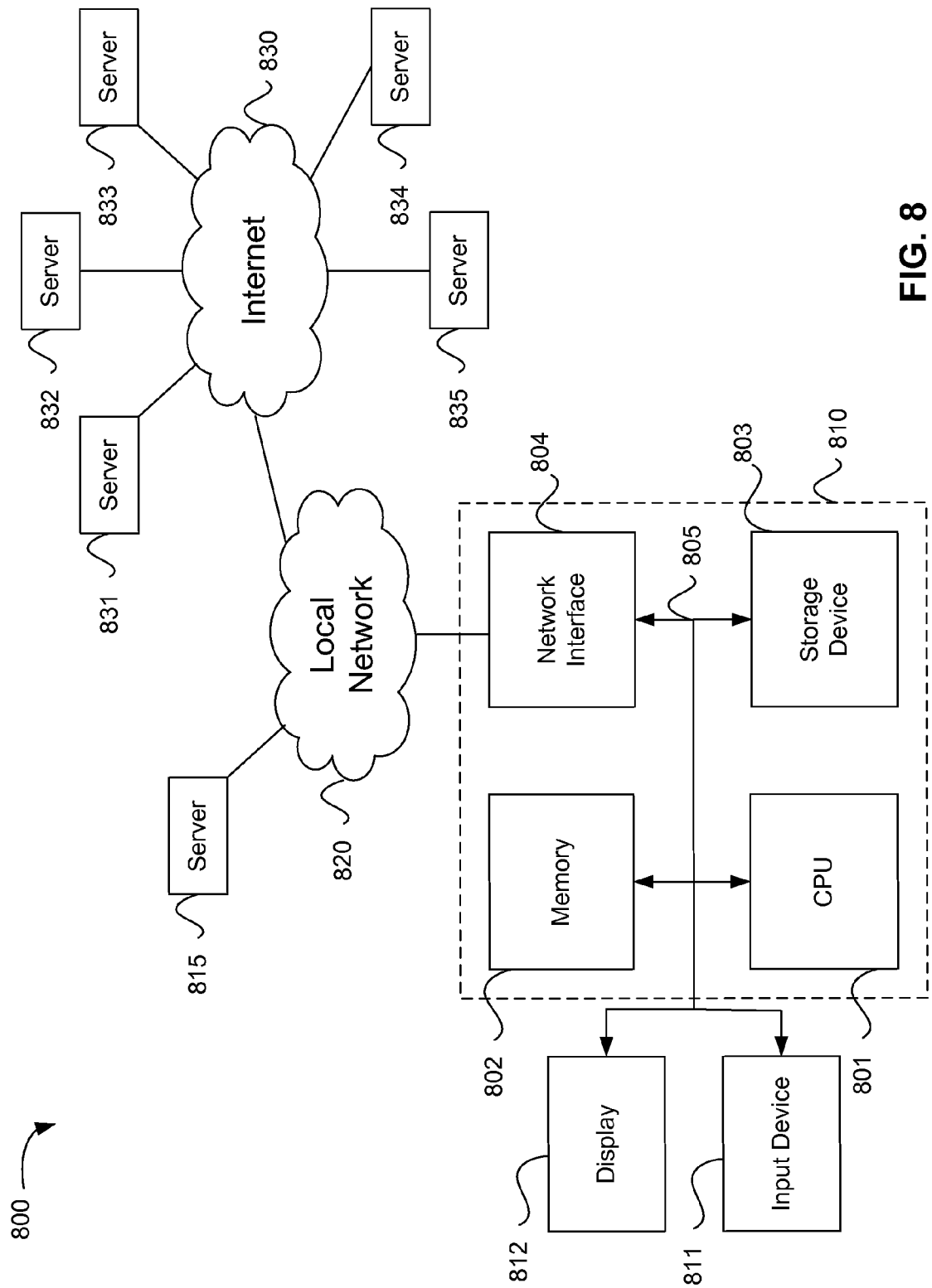
FIG. 8 illustrates an exemplary computer system according to one embodiment.

An exemplary computer system 810 is illustrated in FIG. 8. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:
1. A computer-implemented method, comprising:
receiving, at a processor, a request to synchronize a first folder object in a first folder structure of a first database with a first corresponding folder object in a second folder structure of a second database, wherein the first folder structure is configured to traverse objects stored in the first database and the second folder structure is configured to traverse objects stored in the second database;
determining, by the processor, that the first folder object contains a first child object that is missing from the first corresponding folder object;
identifying, by the processor, that the first child object is selected for selective synchronization;
converting, by the processor, the first child object to an orphan object, wherein the orphan object is stored in the first database but is inaccessible by traversing the first folder structure;
receiving, by the processor, another request to synchronize a second folder object in the first folder structure with a second corresponding folder object in the second folder structure;
determining, by the processor, that the second corresponding folder object contains a second child object that is missing from the second folder object;
identifying, by the processor, that the second child object corresponds to the orphan object, or that the second child object does not correspond to the orphan object;

when the second child object corresponds to the orphan object:
  adopting, by the processor, the orphan object as part of the second folder object such that traversing the second folder object includes visiting the orphan object; and
when the second child object does not correspond to the orphan object:
  downloading, by the processor, the second child object from the second database to the first database.

2. The computer-implemented method of claim 1, wherein determining that the first folder object contains a first child object that is missing from the first corresponding folder object comprises:
  querying, by the processor, a first list of child objects associated with the first folder from the first database;
  retrieving, by the processor, a second list of child objects associated with the corresponding folder from the second database; and
  determining, by the processor, that the first child object is in the first list but is missing from the second list.

3. The computer-implemented method of claim 1, wherein converting the first child object to an orphan object comprises clearing, by the processor, a parent folder field of the first child object, the parent folder field being configured to store an identifier belonging to a parent of the first child object.

4. The computer-implemented method of claim 1, wherein identifying that the first child object is selected for selective synchronization comprises determining, by the processor, that a content synchronization flag belonging to the first child object has been set.

5. The computer-implemented method of claim 1, wherein identifying that the second child object corresponds to the orphan object includes determining, by the processor, that an identifier associated with the second child object is the same as another identifier associated with the orphan object.

6. The computer-implemented method of claim 1, wherein adopting the orphan object includes setting, by the processor, a parent folder field of the orphan object to an identifier associated with the second folder object.

7. The computer-implemented method of claim 1, wherein identifying, by the processor, that the first child object is selected for selective synchronization further comprises identifying, by the processor, that the first child object is not selected for selective synchronization,
  when the first child object is selected for selective synchronization:
    converting, by the processor, the first child object to the orphan object; and
  when the first child object is not selected for selective synchronization:
    deleting, by the processor, the first child object from the first database.

8. A non-transitory computer readable storage medium storing one or more programs, the one or more programs comprising instructions for:
  receiving a request to synchronize a first folder object in a first folder structure of a first database with a first corresponding folder object in a second folder structure of a second database, wherein the first folder structure is configured to traverse objects stored in the first database and the second folder structure is configured to traverse objects stored in the second database;
  determining that the first folder object contains a first child object that is missing from the first corresponding folder object;
  identifying that the first child object is selected for selective synchronization;
  converting the first child object to an orphan object, wherein the orphan object is stored in the first database but is inaccessible by traversing the first folder structure;
  receiving another request to synchronize a second folder object in the first folder structure with a second corresponding folder object in the second folder structure;
  determining that the second corresponding folder object contains a second child object that is missing from the second folder object;
  identifying that the second child object corresponds to the orphan object, or that the second child object does not correspond to the orphan object;
  when the second child object corresponds to the orphan object:
    adopting the orphan object as part of the second folder object such that traversing the second folder object includes visiting the orphan object; and
  when the second child object does not correspond to the orphan object:
    downloading the second child object from the second database to the first database.

9. The non-transitory computer readable storage medium of claim 8, wherein determining that the first folder object contains a first child object that is missing from the first corresponding folder object comprises:
  querying a first list of child objects associated with the first folder from the first database;
  retrieving a second list of child objects associated with the corresponding folder from the second database; and
  determining that the first child object is in the first list but is missing from the second list.

10. The non-transitory computer readable storage medium claim 8, wherein converting the first child object to an orphan object comprises clearing a parent folder field of the first child object, the parent folder field being configured to store an identifier belonging to a parent of the first child object.

11. The non-transitory computer readable storage medium of claim 8, wherein identifying that the first child object is selected for selective synchronization comprises determining that a content synchronization flag belonging to the first child object has been set.

12. The non-transitory computer readable storage medium of claim 8, wherein identifying that the second child object corresponds to the orphan object includes determining that an identifier associated with the second child object is the same as another identifier associated with the orphan object.

13. The non-transitory computer readable storage medium of claim 8, wherein adopting the orphan object includes setting a parent folder field of the orphan object to an identifier associated with the second folder object.

14. The non-transitory computer readable storage medium of claim 8, wherein identifying that the first child object is selected for selective synchronization further includes identifying that the first child object is not selected for selective synchronization, and further comprising:
  when the first child object is selected for selective synchronization:
    converting the first child object to the orphan object; and
  when the first child object is not selected for selective synchronization:
    deleting the first child object from the first database.

15. A computer implemented system, comprising:
  one or more computer processors; and a non-transitory computer-readable storage medium comprising instructions, that when executed, control the one or more computer processors to be configured for:

receiving a request to synchronize a first folder object in a first folder structure of a first database with a first corresponding folder object in a second folder structure of a second database, wherein the first folder structure is configured to traverse objects stored in the first database and the second folder structure is configured to traverse objects stored in the second database;

determining that the first folder object contains a first child object that is missing from the first corresponding folder object;

identifying that the first child object is selected for selective synchronization;

converting the first child object to an orphan object, wherein the orphan object is stored in the first database but is inaccessible by traversing the first folder structure;

receiving another request to synchronize a second folder object in the first folder structure with a second corresponding folder object in the second folder structure;

determining that the second corresponding folder object contains a second child object that is missing from the second folder object;

identifying that the second child object corresponds to the orphan object, or that the second child object does not correspond to the orphan object;

when the second child object corresponds to the orphan object:
adopting the orphan object as part of the second folder object such that traversing the second folder object includes visiting the orphan object; and when the second child object does not correspond to the orphan object:
downloading the second child object from the second database to the first database.

16. The computer implemented system of claim 15, wherein determining that the first folder object contains a first child object that is missing from the first corresponding folder object comprises:

querying a first list of child objects associated with the first folder from the first database;

retrieving a second list of child objects associated with the corresponding folder from the second database; and determining that the first child object is in the first list but is missing from the second list.

17. The computer implemented system of claim 15, wherein converting the first child object to an orphan object comprises clearing a parent folder field of the first child object, the parent folder field being configured to store an identifier belonging to a parent of the first child object.

18. The computer implemented system of claim 15, wherein identifying that the second child object corresponds to the orphan object includes determining that an identifier associated with the second child object is the same as another identifier associated with the orphan object.

19. The computer implemented system of claim 15, wherein adopting the orphan object includes setting a parent folder field of the orphan object to an identifier associated with the second folder object.

20. The computer implemented system of claim 15, wherein identifying that the first child object is selected for selective synchronization further includes identifying that the first child object is not selected for selective synchronization, and further comprising:

when the first child object is selected for selective synchronization:
converting the first child object to the orphan object; and when the first child object is not selected for selective synchronization:
deleting the first child object from the first database.

* * * * *